United States Patent Office
3,533,740
Patented Oct. 13, 1970

1

3,533,740
PROCESS FOR MANUFACTURING ACTIVE
MANGANESE DIOXIDE
Alfred Grund, Versailles, and Pierre François Malessan,
Epinay-sur-Seine, France, assignors to Societe Les Piles
Wonder, Saint-Ouen, France
Filed Dec. 20, 1967, Ser. No. 692,109
Claims priority, application France, Dec. 23, 1966,
88,732
Int. Cl. C01g 45/02; H01m 15/00
U.S. Cl. 23—145                                12 Claims

ABSTRACT OF THE DISCLOSURE

A manganese salt is added to an alkaline hydroxide while bubbling an oxidizing gas through the alkaline hydroxide solution, which is maintained between about 15° C. and about 30° C. The oxidation occurs substantially at the same time thereby avoiding the formation of manganous hydroxide. The apparatus comprises a vat having a microporous bottom which permits a gas to be passed therethrough. The porosity of the bottom is such that the gas emerges into the vat through the microporous bottom in bubbles of very small dimensions. The vat is provided with a stirrer and co-operates with means for introducing a determined quantity of liquid progressively into the vat.

The present invention relates to processes and apparatuses for manufacturing manganese dioxide which is dioxide as well as to the product obtained by this process. The invention is more especially concerned with the processes and apparatuses leading to a manganese dioxide which is usable in an electrochemical cell, in particular a primary cell of the Leclanché type.

Objects of the invention are to improve these processes and apparatuses, notably with respect to both a reduced cost price and the activity of the manganese dioxide obtained in particular in an electrochemical cell such as a Leclanché primary cell.

According to the present invention, a manganese dioxide having a degree of oxidation between $MnO_{1.5}$ and $MnO_2$ is manufactured by pouring a manganese salt, in particular manganese sulfate, into an alkaline hydroxide, in particular sodium hydroxide, while blowing into or bubbling through the alkaline hydroxide solution, maintained between about 15 and about 30° C., an oxidizing gas, in particular air, so as to avoid the formation of manganous hydroxide.

Advantageously this preparation takes place in a device comprising a vat whose bottom is microporous, so as to permit the bubbling in, through this bottom, of a gas giving bubbles of very small dimensions, this vat being provided, moreover, with a stirrer and co-operating with means for continuously adding a determined quantity of a liquid into the vat.

Preferably the manganese oxide having a degree of oxidation between $MnO_{1.5}$ and $MnO_2$ is then subjected to a dismutation operation, known in itself, which comprises treating this oxide by a strong acid, in particular by sulphuric acid, the dismutation operation permitting, in the case of an oxide prepared according to the invention, a manganese oxide to be obtained having a degree of oxidation which can reach about $MnO_{1.95}$.

Figure 1:
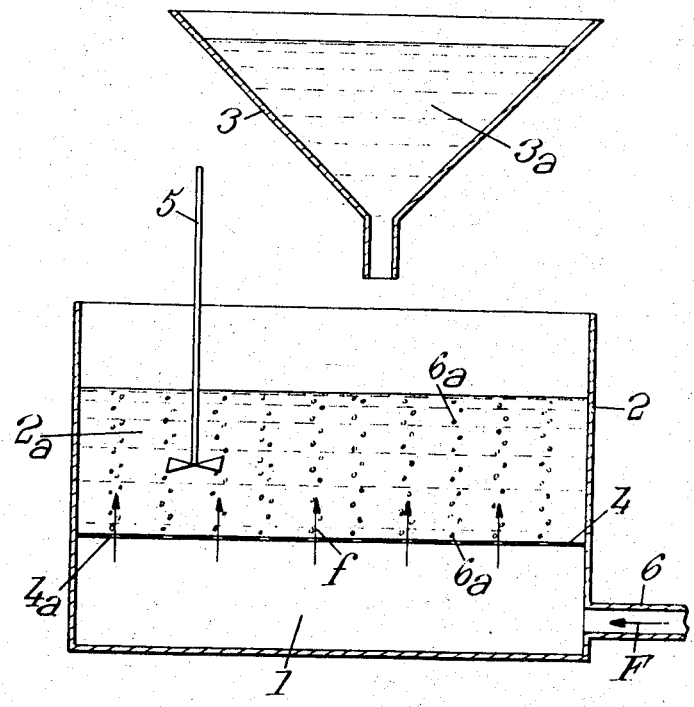
Figure 2:
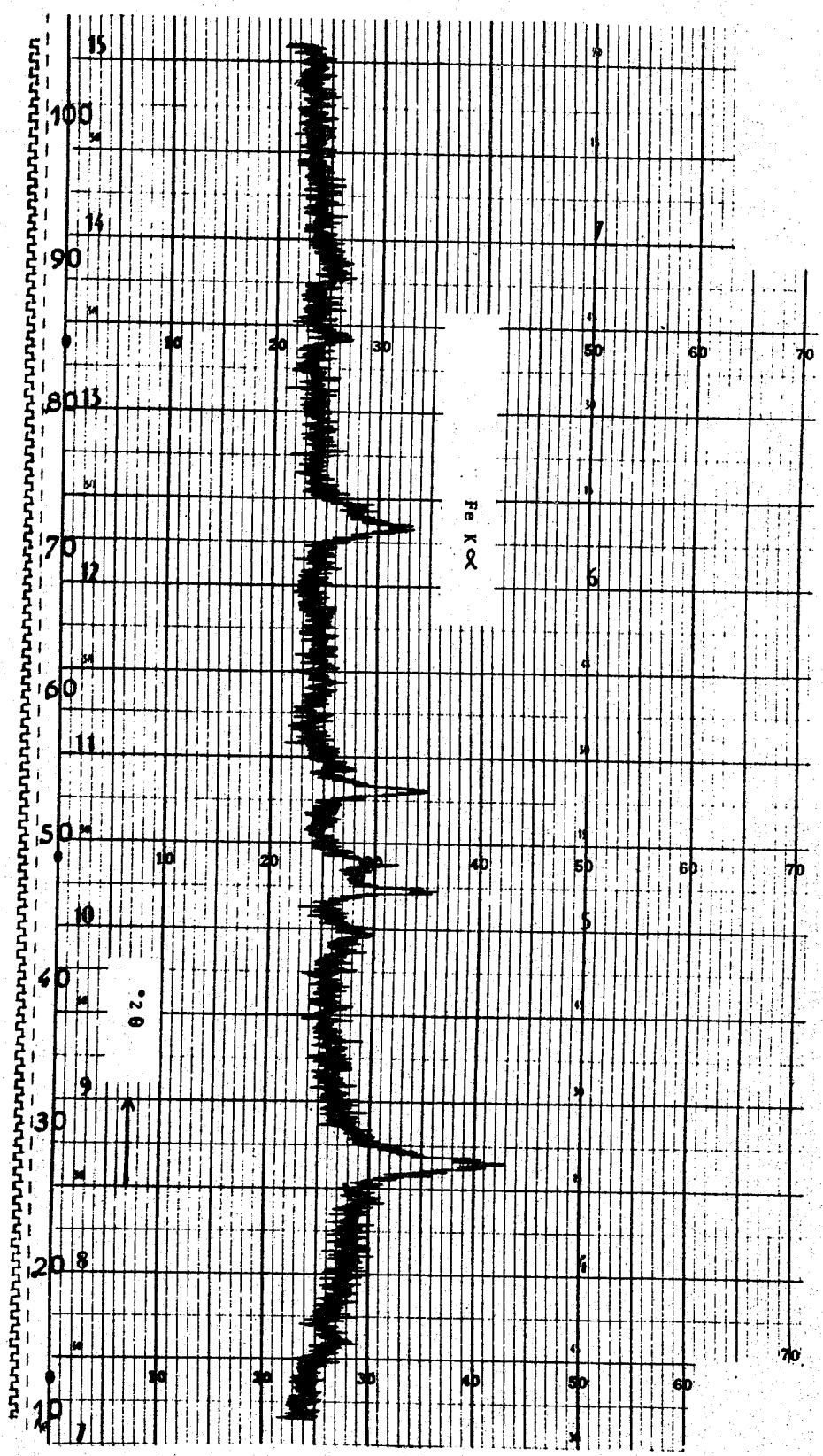

The present invention will be easily understood from the following specific description, given merely by way of example, with reference to the accompanying drawings, in which:

FIG. 1 illustrates in a schematic manner an apparatus for carrying out the process according to the invention;
And FIG. 2 represents an X-ray diffraction diagram of the manganese dioxide of formula $MnO_{1.95}$ obtained according to the invention, this manganese dioxide having undergone dismutation.

The following specific description relates to the preparation of a manganese dioxide which has, in particular, an excellent activity for its use as a cathode material in an electrochemical cell such as a Leclanché primary cell.

First of all it will be recalled that the performance of an electrochemical cell, in particular of a Leclanché primary cell, using manganese dioxide as cathode material (as "depolarizer"), depends to a large extent on the quality of the manganese dioxide.

This quality, which is often called "activity," of the manganese dioxide depends on the method of preparation of the product, for the quality is connected with the crystalline structure, the specific surface, the texture, the degree of oxidation and other physico-chemical properties of the oxide.

For a long time it was considered that the only manganese dioxides that fulfilled the criteria of quality required for making a depolarizer for an electrochemical cell were the manganese dioxides prepared by electrolysis. Unfortunately this preparation has disadvantages, in particular a high cost price. For this reason, other manufacturing processes have been proposed, other than by electrolysis.

In particular, French Pat. No. 1,306,706 filed Sept. 6, 1961 in the name of Société Les Piles Wonder is concerned with a process of preparing active manganese dioxide. That process comprises the steps of precipitating, from a solution of manganese sulfate, white manganous hydroxide $Mn(OH)_2$, washing this precipitate until the pH is of the order of 8 to 9, subjecting the manganous hydroxide, in its washing water, to an oxidation treatment by a suitable oxidizer, for example by bubbling air or oxygen into this manganous hydroxide suspension, which gives an oxide $MnO_x$ ($x$ being lower than or equal to 1.5) and dismutating this oxide with an acid medium so as to obtain a manganese dioxide $MnO_y$ with $y$ of the order of 1.90 to 1.95. Unfortunately this process has the disadvantage of having a very low yield (lower than 50%) due to the low degree of oxidation of the intermediate oxide $MnO_x$ before dismutation.

The present invention permits of preparing, before dismutation, a manganese oxide $MnO_x$ in which which $x$ is equal to or greater than 1.5 (it is normally between 1.80 and 1.90) with a high yield which can reach up to 100%.

The present invention comprises the steps of preparing a manganese oxide having a degree of oxidation between $MnO_{1.5}$ and $MnO_2$ by pouring a manganese salt, in particular manganese sulfite, into an alkaline hydroxide, in particular sodium hydroxide, while blowing into or bubbling through the alkaline hydroxide solution, maintained between about 15 and about 30° C., an oxidizing gas, in particular air, the oxidation taking place at the same time as the precipitation, so as to avoid the formation of manganous hydroxide.

The most favourable conditions for obtaining a high degree of oxidation are realized, according to the present invention, by slowly adding an aqueous solution of $MnSO_4$ (or of other soluble Mn salts) to an aqueous solution of NaOH (or KOH, $NH_4OH$, etc.) through the entire volume of which is constantly passed a current of tiny bubbles of oxygen, or preferably of air.

The reaction takes place according to the following relation:

$$Mn^{++} + 2(OH)^- + \left(\frac{x-1}{2}\right) O_2 \rightarrow MnO_x + H_2O$$

It is important that the current of oxidizing gas is comprised of bubbles of very small dimensions, in order that its oxidizing action is as great as possible. This result can be obtained by injecting the gas into the solution of the hydroxide during the addition of MnSO$_4$, and even before the beginning of this addition, through sintered glass, sintered porcelain, sintered metals, or simply through a screen of artificial or natural textile of very fine mesh.

Another important characteristic of the invention is the maintenance of a temperature between about 15 and about 30° C. in the reaction medium. For this purpose the alkaline solution and the manganese salt solution are maintained at a temperature between 15° C. and 30° C., in particular of the order of 20° C., and the gas is also blown in at a temperature between 15° C. and 30° C., in particular of the order of 20° C., in order not to modify the temperature of the reaction medium.

Indeed, it has been noted by the applicants that if the temperature was lower than 15° C. the reaction took place too slowly and the degree of oxidation of the manganese dioxide was too low, whereas, if the temperature substantially exceeded 30° C., the crystals formed in the course of the precipitation grew too quickly, which hindered the oxidation from taking place correctly, resulting in a product having a low degree of oxidation ($x$ lower than 1.5).

In FIG. 1, an apparatus is illustrated for carrying out the above mentioned process. Such an apparatus comprises a vat 2 separated by a sieve 4 from a compartment 1 in which the compressed air (arrow $f$) is introduced through a tube 6. At the interior of this vat is located a stirrer 5 and above the vat, a second vat 3 permitting the progressive introduction of the manganese salt, in aqueous solution 3a, into the alkaline hydroxide 2a located in the vat 2.

The process is carried out as follows in the apparatus of FIG. 1. A determined quantity of an aqueous solution of an alkaline hydroxide, for example sodium hydroxide, is introduced into the vat 2. The delivery of compressed air or of another oxidizing gas is begun through the tube 6, which gives tiny bubbles 6a passing through the holes 4a and rising through the solution in the vat 2 (arrows $f$). At the end of about 10 minutes, the solution of the soluble manganese salt, in particular manganese sulfate, is introduced slowly, while continuing the introduction of compressed air or other oxidizing gas. The stirrer 5 is put in operation either before or just at the beginning of the addition of the manganese salt.

In order that the manner of obtaining the oxide MnO$_x$ will be better understood, two non-limiting examples will now be given.

EXAMPLE I

In the vat shown in FIG. 1, the screen 4 forming the bottom of the vat is comprised of a filtering type screen comprising small orifices 4a. This vat contains at the beginning 293 litres of a solution of NaOH having 7.5 gram-molecules per litre, and this solution is at room temperature (of the order of 20° C.).

The compressed air is injected at a rate of 2 cubic meters per hour, this injection beginning ten minutes before the beginning of the reaction. The reaction is started by making a solution of MnSO$_4$, having one gram-molecule per litre, flow slowly from the container or vat 3. In this manner, 1,000 litres of this sulfate solution contained in the container 3 are poured with a regular flow. The flow is calculated so that the addition of sulfate will be finished at the end of two hours (the flow is thus 500 litres/hour). The injection of compressed air is maintained during the entire duration of the addition of manganese sulfate, still at a rate of 2 cubic meters of air per hour.

The product formed, after centrifuging, corresponds to the formula MnO$_{1.85}$ and contains about 14% water. Its crystalline structure is of the delta-MnO$_2$ type and it has a specific surface of 65 m.$^2$/g.

EXAMPLE II

In the same reaction vat as that of Example I, and operating at the same temperature, still with the beginning of the injection of air ten minutes before the beginning of the reaction at a rate of 2 m.$^3$/hour, 1,000 litres of MnSO$_4$, having two gram-molecules per litre, are introduced, at a rate of 500 litres per hour, into the reaction vat, which contained initially 586 litres of a solution of NaOH having 7.5 gram-molecules per litre. The injection of air is maintained during the entire duration of the reaction at the rate 2 m.$^3$/hour. After centrifuging, a product is obtained having substantially the same physical and chemical properties as the compound of Example I.

Although a reaction duration of the order of two hours has been indicated in the two examples, it should be understood that this duration can be considerably modified without changing the quality of the oxide prepared. What is important is that the reaction takes place at a temperature of the order of 15 to 30° C., in a strongly alkaline medium and in the presence of an oxidizing gas intimately mixed with the liquid reaction medium.

Although the oxide MnO$_x$ prepared as indicated previously can be used directly, in particular as a cathode material (depolarizer) in an electrochemical cell, it is preferable to treat this compound by acid dismutation.

The dismutation reaction by acid treatment increases considerably the activity of the product, not only by increasing the degree of oxidation of the oxide, but also by modifying certain physico-chemical properties of the compound.

The transformation from MnO$_x$ to MnO$_y$ with $y$ greater than $x$, by acid treatment, is in fact accompanied by a change in the crystalline structure, MnO$_x$ belonging to the delta- MnO$_2$ type (strongly hydrated) whereas MnO$_y$ belongs to the gamma (or rho) MnO$_2$ type.

The dismutation of the oxide MnO$_x$ takes place according to the following reaction:

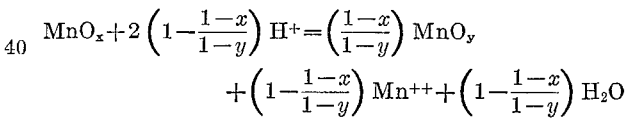

$$MnO_x + 2\left(1-\frac{1-x}{1-y}\right)H^+ = \left(\frac{1-x}{1-y}\right)MnO_y + \left(1-\frac{1-x}{1-y}\right)Mn^{++} + \left(1-\frac{1-x}{1-y}\right)H_2O$$

The acid is preferably H$_2$SO$_4$, but HNO$_3$, CH$_3$COOH or other mineral acids can also be used.

Before treating it with the acid, the first oxide MnO$_x$ is centrifuged and dried, or preferably, only centrifuged (humidity about 50% by weight).

This dismutation acid treatment can be realized in an ordinary vat provided with a stirrer and a heating system and coated at the interior with an anti-acid layer.

By way of example, 1,000 kg. of oxide MnO$_x$ (obtained by the process of Example I or II mentioned above) was treated for two hours by 2,734 kg. of sulphuric acid having 1.19 grammolecules per litre, the temperature of the acid being about 70° C.

The quantity of acid used must be greater than the theoretical (stoichiometric) quantity; the excess can be comprised between 5 and 200% for example, and is advantageously of the order of 100%.

The treatment temperature can vary to a large extent, but this variation leads to a modification of the duration of the treatment.

After the end of this treatment, the resulting oxide MnO$_y$ is centrifuged, washed with water and dried. It then corresponds to the formula MnO$_{1.95}$ and contains about 5% by weight of water. Its crystalline structure is of the gamma (or rho) MnO$_2$ type (eta according to the nomenclature of Glemser).

In FIG. 2 an X-ray diffraction diagram of this compound has been illustrated. Its specific surface (measured by the Brenner, Emmet and Teller method) is 41 m.$^2$/g.

In order to illustrate the advantages of the invention, the comparative performances are given hereafter of primary cells of the Lecanché type comprising manganese dioxide, either natural alone, or natural mixed with a dioxide prepared by electrolysis (according to the conventional processes), or natural mixed with a dioxide prepared according to the invention (with dismutation).

This table shows clearly that the invention permits a manganese dioxide of excellent quality to be obtained, after dismutation; moreover, the cost price is lower than that of manganese dioxide obtained by electrolysis.

| Duration in hours and minutes at | Heavy discharge [1] | | Light discharge [2] | |
|---|---|---|---|---|
| | 1 volt | 0.9 volt | 1 volt | 0.9 volt |
| *Cell 1* (type R. 12): 100% natural manganese dioxide from Gabon | 3.35 | 4.15 | 69 | 74 |
| Cell 2 (type R.12): 30% electrolytic manganese dioxide 70% natural manganese dioxide from Gabon | 4 | 4.50 | 70 | 82 |
| Cell 3 (type R. 12): 30% manganese dioxide prepared according to Example I or II and dismutated 70% natural manganese dioxide from Gabon | 4 | 5 | 78.30 | 88.15 |

[1] Heavy discharge: Alternate periods of five minutes discharge through 5 ohms and 55 minutes rest, for ten hours per day and seven days per week.
[2] Light discharge: Alternate periods of four hours discharge through 50 ohms and 20 hours rest, for seven days per week.

The manganese dioxides manufactured according to the invention, whatever be the $MnO_x$ type (before dismuttion) or the $MnO_y$ type (after dismutation), are particularly adapted for electrochemical cells of the Leclanché type, but they are also suitable for other cells, in particular for the primary or secondary alkaline elements of the type $Zn/MnO_2$. They can also be used for manufacturing capacitors and as catalysts for different chemical syntheses.

The process and the apparatus according to the present invention have numerous advantages, in particular the following:

First of all, they permit a manganese dioxide to be obtained having an activity at least as good as that of a manganese dioxide obtained by electrolysis, but at a lower cost price than the electrolytic process.

They permit a manganese dioxide to be obtained, which, even before dismutation, has a sufficient activity for many applications.

What we claim is:

1. A process for manufacturing manganese dioxide having a degree of oxidation between $MnO_{1.5}$ and $MnO_2$, comprising the steps of:
   adding a manganese salt to an alkaline hydroxide solution having a temperature in the range from about 15° C. to about 30° C.,
   while bubbling an oxidizing gas through said alkaline hydroxide solution,
   so as to avoid the formation of manganous hydroxide.

2. A process according to claim 1 in which said manganese salt is manganese sulfate.

3. A process according to claim 1 in which said alkaline hydroxide is sodium hydroxide.

4. A process according to claim 1 in which said oxidizing gas is air.

5. A process according to claim 1 in which said oxidizing gas is oxygen.

6. A process according to claim 1 in which said oxidizing gas is bubbled in the form of tiny bubbles through the entire volume of said alkaline hydroxide solution from before the addition of said manganese salt into said alkaline hydroxide solution as well as during said addition.

7. A process according to claim 6, wherein said gas is bubbled into said alkaline hydroxide solution by passing said gas through a microporous body.

8. A process according to claim 7, wherein said microporous body is constructed of a material chosen from the group consisting of sintered glass, sintered porcelain and sintered metal.

9. A process according to claim 7 wherein said microporous body comprises a screen having a very fine mesh, said screen constructed of a material selected from the group consisting of artificial textiles and natural textiles.

10. A process according to claim 1 in which the manganese oxide having a degree of oxidation between $MnO_{1.5}$ $MnO_2$ is then subjected to a dismutation operation by treatment with a strong acid to obtain a manganese oxide having a degree of oxidation up to $MnO_{1.95}$.

11. A process according to claim 10 in which the final degree of oxidation is about $MnO_{1.95}$.

12. A process for manufacturing manganese dioxide having a degree of oxidation between $MnO_{1.5}$ and $MnO_2$, comprising the steps of:
   adding a manganese salt to an alkaline hydroxide solution having a temperature in the range from about 15° C. to about 30° C.,
   bubbling an oxidizing gas through the entire volume of alkaline hydroxide solution, beginning before the addition of said manganese salt and continuing during said addition, said bubbling being producing by passing the oxidizing gas through a microporous body,
   thereby avoiding formation of manganous hydroxide. hydroxide.

References Cited

UNITED STATES PATENTS 1,986,889    1/1935    Fulton _____ 23—119

FOREIGN PATENTS 1,306,706    9/1962    France.

OSCAR R. VERTIZ, Primary Examiner

H. S. MILLER, Assistant Examiner

U.S. Cl. X.R.

136—138, 153; 252—62.51